United States Patent
Augustin et al.

(10) Patent No.: US 9,239,889 B2
(45) Date of Patent: Jan. 19, 2016

(54) ADAPTIVE SEARCH AND NAVIGATION THROUGH SEMANTICALLY AWARE SEARCHING

(71) Applicant: SugarCRM Inc., Cupertino, CA (US)

(72) Inventors: Larry Augustin, Los Altos, CA (US); Majed Itani, San Jose, CA (US); Wes Moran, Merrimack, NH (US); Lila Tretikov, Los Gatos, CA (US)

(73) Assignee: SugarCRM Inc., Cupertino, CA (US)

( * ) Notice: Subject to any disclaimer, the term of this patent is extended or adjusted under 35 U.S.C. 154(b) by 216 days.

(21) Appl. No.: 13/844,432

(22) Filed: Mar. 15, 2013

(65) Prior Publication Data

US 2014/0280062 A1    Sep. 18, 2014

(51) Int. Cl.
*G06F 17/30* (2006.01)

(52) U.S. Cl.
CPC ............... *G06F 17/30991* (2013.01)

(58) Field of Classification Search
USPC .................................. 707/706, 722
See application file for complete search history.

(56) References Cited

U.S. PATENT DOCUMENTS

| | | | |
|---|---|---|---|
| 7,590,936 B1 * | 9/2009 | Bendig ................. | 715/272 |
| 7,703,040 B2 * | 4/2010 | Cutrell et al. ......... | 715/792 |
| 7,774,348 B2 * | 8/2010 | Delli Santi et al. ... | 707/748 |
| 7,788,247 B2 * | 8/2010 | Wang et al. .......... | 707/705 |
| 7,805,450 B2 * | 9/2010 | Delli Santi et al. ... | 707/754 |
| 7,882,091 B2 * | 2/2011 | Schneider ............. | 707/705 |
| 7,958,127 B2 * | 6/2011 | Edmonds et al. ..... | 707/748 |
| 8,122,061 B1 * | 2/2012 | Guinness .............. | 707/802 |
| 8,260,769 B1 * | 9/2012 | Fuller .................... | 707/721 |
| 8,386,482 B2 * | 2/2013 | Gopalakrishnan .... | 707/732 |

* cited by examiner

*Primary Examiner* — Kim Nguyen

(74) *Attorney, Agent, or Firm* — Steven M. Greenberg, Esq.; CRGO Law

(57) ABSTRACT

Embodiments of the invention provide a method, system and computer program product for semantically aware adaptive searching and navigation of application data. In an embodiment of the invention, a method for semantically aware adaptive searching and navigation of application data is provided. The method includes associating different tags with different data of a database of unstructured data, each of the different tags corresponding to selected semantics of different objects encapsulating data for a data driven application executing in memory of a host computing system. The method also includes applying in the memory of the host computing system a filter operation to both the tags of the unstructured data and also the different objects, using filter criteria corresponding to one or more semantics of the different objects. Finally, the method includes displaying in a user interface to the data driven application a result set from the filter operation.

16 Claims, 2 Drawing Sheets

ADAPTIVE SEARCH AND NAVIGATION THROUGH SEMANTICALLY AWARE SEARCHING

BACKGROUND OF THE INVENTION

1. Field of the Invention

The present invention relates to database utilization in a data driven application and more particularly to data searching across both structured and unstructured data stores.

2. Description of the Related Art

Databases are designed to offer an organized mechanism for storing, managing and retrieving information. Databases exist in the most rudimentary form of a flat file in which each line of the file is a record and each number or string separated by a pre-determined delimiter is a field of the record. More advanced databases organize data through the use of structured tables able to be managed by way of a database management system ("DBMS"). Modern databases are organized through a number of different technological paradigms, including relational models (relational database), object models (object database), document models (document database), and the like. In most cases, the structure and organization of data in the database (namely the different tables, and records and fields defined therein) conform to a pre-defined schema intended to model a problem and/or solution evidenced by the database.

A distinction is to be drawn between the organization and structure of data in a database, and the organization and structure of data utilized within a data driven application incorporating the use of a database. In the latter case, the application can define a structured manner in which data is accessed and presented within a user interface of the application. For example, one structured manner might include a form based interface in which the completion of pre-specified fields with data can translate to a query of an underlying database. In another example, a structured manner might include the display of records pre-filtered according to a query associated with a specified user interface control.

Conversely, unstructured methods of accessing data of an application include the venerable search field in which keyword terms can be provided as input to a search query—generally applied according to rules of Boolean logic. In this case, the entirety of the database associated with the application can be searched utilizing available search query operations for the database and supported by the underlying DBMS. Notwithstanding, the success of a free form keyword search in producing a meaningful result set depends upon either the a priori knowledge of the structure of the data within the database and the relationship between different records stored therein, or a string match against any fields in the database regardless of their relational structure, type or semantic attributes. However, the success of a structured navigation of data in an application depends largely upon the pre-configuration of the user interface of the application and whether or not such user interface pre-configuration affords enough flexibility to permit the end user to discover and retrieve a meaningful result set.

Search, filter or navigation paradigms present today do not address the problem of heterogeneous underlying data set structure in a cohesive, simple to understand manner. Rather, present filter and navigation paradigms present static discovery methods constrained to one of the data structure types underlying the application and present no unified methodology to navigate multiple types of data sets within one user interface element.

BRIEF SUMMARY OF THE INVENTION

Embodiments of the present invention address deficiencies of the art in respect to structure and unstructured searching of application data and provide a novel and non-obvious method, system and computer program product for semantically aware adaptive searching and navigation of application data. In an embodiment of the invention, a method for semantically aware adaptive searching and navigation of application data is provided. The method includes implicitly and explicitly associating different tags with different data of a database of unstructured data, each of the different tags corresponding to selected semantics of different objects encapsulating data for a data driven application executing in memory of a host computing system and also different field types of those objects. The method also includes applying in the memory of the host computing system a filter operation to both the tags of the unstructured data and also the different object and field types, using filter criteria corresponding to one or more semantics of the different objects. Finally, the method includes displaying in a user interface to the data driven application a result set from the filter operation.

In one aspect of the embodiment, the method can include receiving keyword search terms in a search field of the user interface, applying in the memory of the host computing system a keyword search operation to the unstructured data using the keyword search terms and displaying in the user interface a result set from the keyword search operation. In another aspect of the embodiment, the method can include receiving keyword search terms in a search field of the user interface, applying in the memory of the host computing system a keyword search operation both to the unstructured data and also the encapsulated data of the different objects using the keyword search terms, and displaying in the user interface a result set from the keyword search operation. In yet another aspect of the embodiment, the method can include receiving keyword search terms in a search field of the user interface, applying in the memory of the host computing system a keyword search operation to the unstructured data using the keyword search terms, aggregating the result set from the keyword search operation with the result set from the filter operation and displaying in the user interface the aggregation.

In yet another aspect of the embodiment, the method can include receiving keyword search terms in a search field of the user interface and applying a keyword search operation using the keyword search terms to both the unstructured data and also to the structured data. Consequently, matching strings in the structured data can be used to identify a corresponding type or label of the matching strings and an implicit tag of the structured data can be deduced therefrom. Thereafter, the implicit tag can be used to search the unstructured data to retrieve any additional data explicitly associated with the implicit tag. Finally, a result set can be produced through the aggregation of the keyword search operation across the structured and unstructured data sets and the additional data and the aggregation can be displayed in the user interface.

Finally, in even yet another aspect of the embodiment, the method can include receiving keyword search terms in a search field of the user interface, applying in the memory of the host computing system a keyword search operation both to the unstructured data and also the encapsulated data of the different objects using the keyword search terms, aggregating the result set from the keyword search operation with the result set from the filter operation, and displaying in the user interface the aggregation.

In another embodiment of the invention, an application data processing system can be configured for semantically aware adaptive searching and navigation of application data. The system can include a host computing system that includes one or more server computers each with memory and at least one processor. The system also can include a data driven application executing in the memory of the host computing system, a database of unstructured data coupled to the host computing system and different objects encapsulating data and specified according to different semantics stored in the memory of the host computing system. Finally the system can include an adaptive search and navigation module executing in the memory of the host computing system.

The module can include program code enabled to associate different tags with different data of the database of unstructured data, each of the different tags corresponding to selected ones of the different semantics. The module also can include program code enabled to apply a filter operation to both the tags of the unstructured data and also the different objects, using filter criteria corresponding to one or more semantics of the different objects. Finally, the module can include program code enabled display in a user interface to the data driven application a result set from the filter operation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for semantically aware adaptive searching and navigation of application data. In accordance with an embodiment of the invention, a database of data can be provided for a data driven application and data therein can be associated with tags corresponding to semantics for structured elements of the application. Thereafter, keyword searching can be performed against data in the database and data stored within the structured elements of the application, and also structured navigation can be performed against the tags of the data in the database and the structured elements of the application. Even further, a query can be constructed as an aggregation of a result set produced through keyword searching and the structured navigation. In this way, the flexibility afforded by keyword searching and the speed and efficacy of structured navigation can be combined to provide data discovery flexibility for the end user.

Figure 1:
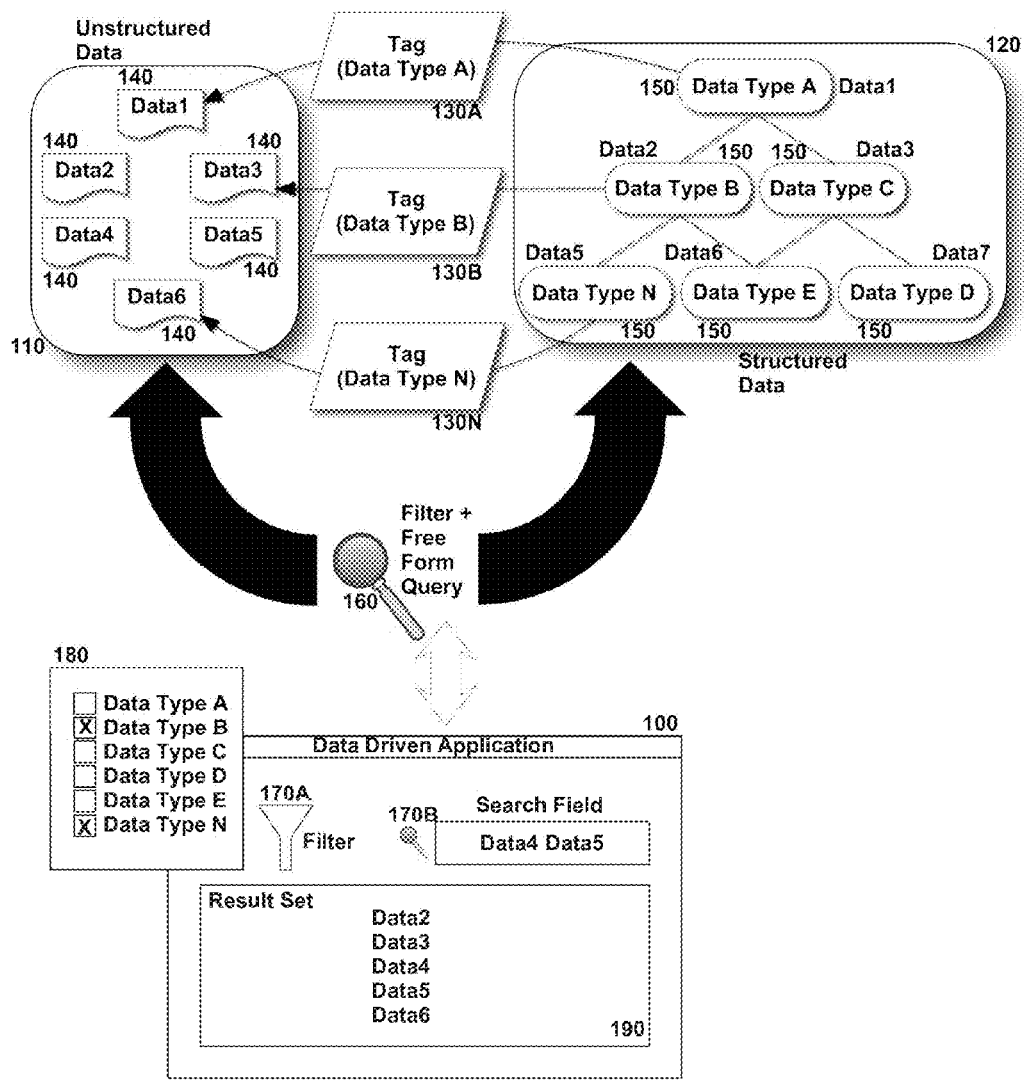
FIG. 1 is a pictorial illustration of a process for semantically aware adaptive searching and navigation of application data.

In further illustration, FIG. 1 pictorially shows a process for semantically aware adaptive searching and navigation of application data. As shown in FIG. 1, structured data 120 can be provided for a data driven application 100. The structured data 120 can include data encapsulated within objects 150 defined according to pre-specified semantics of the data driven application 120. Unstructured data 110 also can be provided within a database for the data driven application 120, including data 140 stored within records of the database. Of note, some or all of the data 140 can be associated with different tags 130A, 130B, 130N corresponding to the semantics of the objects 150 of the structured data 120.

Consequently, a search aggregation 160 of a filter applied to the tags 130A, 130B, 130N and the objects 150, and a keyword search of the data 140 and the data of the objects 150 can be produced. Specifically, within a user interface to the application 100, a filter 170A can be applied through a window 180 specifying a priori known objects 150. Likewise, within the user interface to the application 100, a keyword search can be specified within a search field 170B. A resulting aggregation of the result set of the filter 170A and the keyword search of the search field 170B can be displayed in the result set field 190.

Of note, the user interface described herein can provide a unified search interface that allows the end user to navigate the data driven application 120 entirely via searching, where the data driven application 120 itself extrapolates the semantics of the underlying data 140 (without explicit semantic data present). In this case, the search aggregation 160 identifies which keyword in the search field 170B may apply to the data 140 itself and which are tags 130A, 130B, 130N, labels or data types within the structured data 120. Subsequently, the data driven application 120 can display the data 140 by showing results aggregated by tags 130A, 130B, 130N, labels or data type. The data driven application 120 additionally can convert typed text in the search field 170B into an appropriate syntax used for identifying a priori known objects 150 in the filter 170A.

For example, assuming that the user interface is designed to display the tag: value, label: value or object type: value, in response to an end user submitting to the search field 170B "account IBM", the input is converted into account:IBM and is displayed as a tag in the filter 170B. Furthermore, tags, labels and object types can be encapsulated. In this case if an end user provides in the search field 170A, "account value 30,000", the input is converted into "account.value:30,000" and displayed as a tag in the filter 170B.

Figure 2:
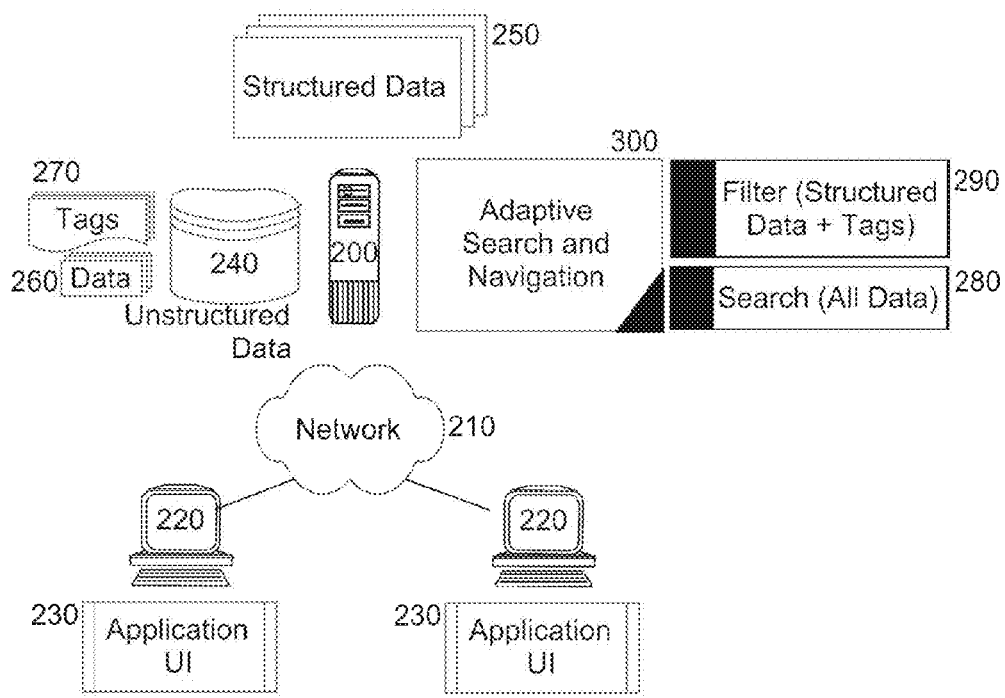
FIG. 2 is a schematic illustration of an application data processing system configured for semantically aware adaptive searching and navigation of application data; and, FIG. 3 is a flow chart illustrating a process for semantically aware adaptive searching and navigation of application data.

The process described in connection with FIG. 1 can be implemented within an application data processing system. In this regard, FIG. 2 schematically shows an application data processing system configured for semantically aware adaptive searching and navigation of application data. The system can include a host computing system 200 that includes one or more server computers each with at least one processor and memory. The host computing system 200 can support the execution of a data driven application (not shown) and can be configured for communicative coupling over computer communications network 210 to different client computers 220 each displaying a user interface 230 to the data driven application.

The host computing system 200 also can include a database management system (not shown) managing one or more databases 240 of data 260 (only a single database shown for the purpose of illustrative simplicity). The host computing system 200 yet further can include structured data 250 in the form of one or more object instances of data structures defined to encapsulate data and accessible according to semantics specified for each of the object instances of the structured data 250. Of note, one or more tags 270 can be applied to each of the data 260 in the one or more databases 240 such that each of the tags 270 corresponds to a semantic term or terms of the structured data 250.

An adaptive search and navigation module 300 can be coupled to the host computing system 200 and can execute in the memory therein. The adaptive search and navigation module 300 can include program code that when executed in the memory of the host computing system 200 can perform a keyword searching operation 280 upon the data 260 in the database or databases 240 and also the data of the structured data 250. The program code of the adaptive search and navigation module 300 when executed in the memory of the host computing system 200 also can perform a filter operation 290 upon the structured data 250 and also the tags 270 off the data 260 of the database or databases 240 based upon one more selected semantics pre-defined for the structured data 250. Optionally, the result set of the keyword searching operation 280 and the filter operation 290 can be aggregated into a single result set for display in the user interface 230 for the data driven application.

Optionally, the program code of the adaptive search and navigation module 300 can parse the terms of a search string in a search field prior to executing the keyword searching operation 280 in order to identify any known ones of the tags 270. If any of the terms of the search string are determined to be known ones of the tags 270, those terms can be visually distinguished from other terms in the search string and applied using the filter operation 290, while the remaining terms of the search string can be applied using the keyword searching operation 280.

Figure 3:
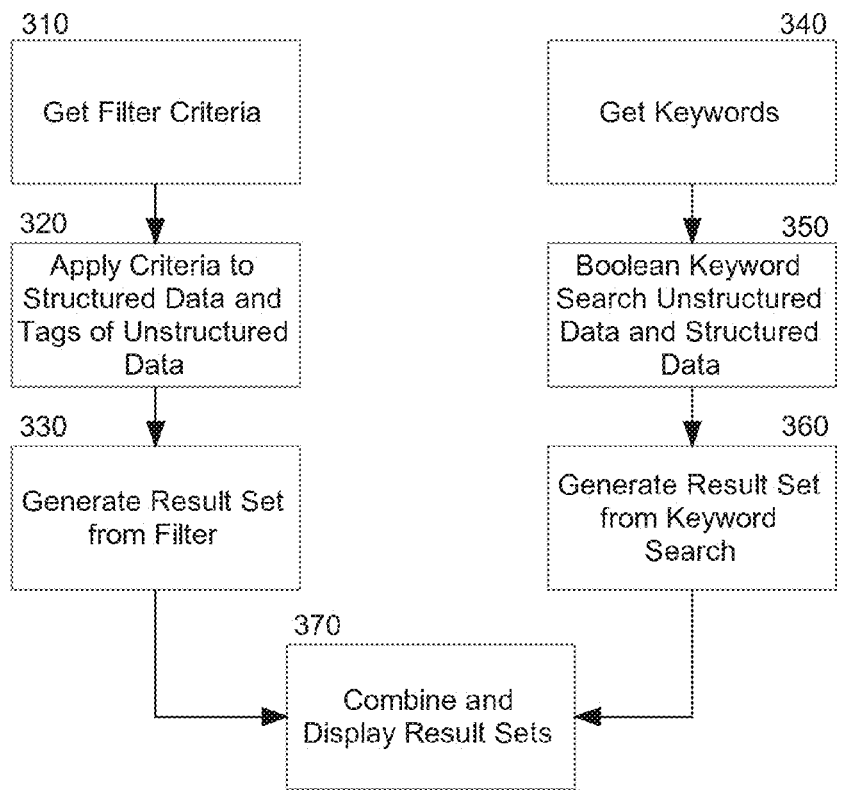

In even yet further illustration of the operation of the adaptive search and navigation module 300, FIG. 3 is a flow chart illustrating a process for semantically aware adaptive searching and navigation of application data. Beginning in block 310, filter criteria can be accepted as input to a user interface to a data driven application. The filter criteria can include semantic terms for different objects of structured data of the data driven application. In block 320, the filter criteria can be applied both to the structured data and also to tags applied to unstructured data of one or more databases in order to produce in block 330 a result set of data associated with the semantic terms of the filter criteria.

Concurrently, in block 340, one or more keyword search terms can be accepted as input to the user interface of the data driven application. The keyword search terms can include different terms that may or may not appear as data in the unstructured data of the one or more databases, and also as data of the different objects of the structured data. In block 350 the keyword search terms can be applied in the course of a Boolean search both to the data of the different objects and also to data of the unstructured data of one or more databases in order to produce in block 360 a result set of data associated with the keyword search terms. Finally, in block 370 the result set from the filter criteria can be aggregated with the result set of the keyword search terms to produce adaptive search results.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for semantically aware adaptive searching and navigation of application data, the method comprising:
   associating different tags with different data of a database of unstructured data, each of the different tags corresponding to selected semantics of different objects encapsulating data for a data driven application executing in memory of a host computing system;
   applying in the memory of the host computing system a filter operation to both the tags of the unstructured data and also the different objects, using filter criteria corresponding to one or more semantics of the different objects;
   displaying in a user interface to the data driven application a result set from the filter operation;
   receiving keyword search terms in a search field of the user interface;
   applying in the memory of the host computing system a keyword search operation both to the unstructured data and also the encapsulated data of the different objects using the keyword search terms;
   aggregating the result set from the keyword search operation with the result set from the filter operation; and,
   displaying in the user interface the aggregation.

2. The method of claim 1, further comprising:
   receiving keyword search terms in a search field of the user interface;
   applying in the memory of the host computing system a keyword search operation to the unstructured data using the keyword search terms; and,
   displaying in the user interface a result set from the keyword search operation.

3. The method of claim 1, further comprising:
   receiving keyword search terms in a search field of the user interface;
   applying in the memory of the host computing system a keyword search operation both to the unstructured data and also the encapsulated data of the different objects using the keyword search terms; and,
   displaying in the user interface a result set from the keyword search operation.

4. The method of claim 1, further comprising:
   receiving keyword search terms in a search field of the user interface;
   applying in the memory of the host computing system a keyword search operation to the unstructured data using the keyword search terms;
   aggregating the result set from the keyword search operation with the result set from the filter operation; and,
   displaying in the user interface the aggregation.

5. The method of claim 4, further comprising:
   identifying amongst the keyword search terms any terms known to correspond to existing ones of the tags of the structured data;
   excluding from the keyword search operation the identified keyword search terms; and,
   performing the filter operation with the identified keywords search terms as filter criteria.

6. The method of claim 1, further comprising:
   identifying one or more tags for a result set produced by the keyword search operation on the structured data;

applying an additional keyword search operation to the unstructured data based upon the identified tags; and, including in the aggregation the result set from the additional keyword search operation.

7. An application data processing system configured for semantically aware adaptive searching and navigation of application data, the system comprising:

a host computing system comprising one or more server computers each with memory and at least one processor;

a data driven application executing in the memory of the host computing system;

a database of unstructured data coupled to the host computing system;

a plurality of different objects encapsulating data and specified according to different semantics stored in the memory of the host computing system; and, an adaptive search and navigation module executing in the memory of the host computing system, the module comprising program code enabled to associate different tags with different data of the database of unstructured data, each of the different tags corresponding to selected ones of the different semantics, to apply a filter operation to both the tags of the unstructured data and also the different objects, using filter criteria corresponding to one or more semantics of the different objects encapsulating data, to display in a user interface to the data driven application a result set from the filter operation, to receive keyword search terms in a search field of the user interface, to apply a keyword search operation both to the unstructured data and also the encapsulated data of the different objects using the keyword search terms, to aggregate the result set from the keyword search operation with the result set from the filter operation, and to display in the user interface the aggregation.

8. The system of claim 7, wherein the program code is further enabled to receive keyword search terms in a search field of the user interface, to apply a keyword search operation to the unstructured data using the keyword search terms and to display in the user interface a result set from the keyword search operation.

9. The system of claim 7, wherein the program code is further enabled to receive keyword search terms in a search field of the user interface, to apply a keyword search operation both to the unstructured data and also the encapsulated data of the different objects using the keyword search terms and to display in the user interface a result set from the keyword search operation.

10. The system of claim 7, wherein the program code is further enabled to receive keyword search terms in a search field of the user interface, to apply a keyword search operation to the unstructured data using the keyword search terms, to aggregate the result set from the keyword search operation with the result set from the filter operation and to display in the user interface the aggregation.

11. A computer program product for semantically aware adaptive searching and navigation of application data, the computer program product comprising:

a non-transitory computer readable storage medium having computer readable program code embodied therewith, the computer readable program code comprising:

computer readable program code for associating different tags with different data of a database of unstructured data, each of the different tags corresponding to selected semantics of different objects encapsulating data for a data driven application;

computer readable program code for applying a filter operation to both the tags of the unstructured data and also the different objects, using filter criteria corresponding to one or more semantics of the different objects;

computer readable program code for displaying in a user interface to the data driven application a result set from the filter operation;

computer readable program code for receiving keyword search terms in a search field of the user interface;

computer readable program code for applying a keyword search operation both to the unstructured data and also the encapsulated data of the different objects using the keyword search terms;

computer readable program code for aggregating the result set from the keyword search operation with the result set from the filter operation; and, computer readable program code for displaying in the user interface the aggregation.

12. The computer program product of claim 11, further comprising:

computer readable program code for receiving keyword search terms in a search field of the user interface;

computer readable program code for applying a keyword search operation to the unstructured data using the keyword search terms; and, computer readable program code for displaying in the user interface a result set from the keyword search operation.

13. The computer program product of claim 11, further comprising:

computer readable program code for receiving keyword search terms in a search field of the user interface;

computer readable program code for applying a keyword search operation both to the unstructured data and also the encapsulated data of the different objects using the keyword search terms; and, computer readable program code for displaying in the user interface a result set from the keyword search operation.

14. The computer program product of claim 11, further comprising:

computer readable program code for receiving keyword search terms in a search field of the user interface;

computer readable program code for applying keyword search operation to the unstructured data using the keyword search terms;

computer readable program code for aggregating the result set from the keyword search operation with the result set from the filter operation; and, computer readable program code for displaying in the user interface the aggregation.

15. The computer program product of claim 14, further comprising:

computer readable program code for identifying amongst the keyword search terms any terms known to correspond to existing ones of the tags of the structured data;

computer readable program code for excluding from the keyword search operation the identified keyword search terms; and, computer readable program code for performing the filter operation with the identified keywords search terms as filter criteria.

16. The computer program product of claim 11, further comprising:

computer readable program code for identifying one or more tags for a result set produced by the keyword search operation on the structured data;

computer readable program code for applying an additional keyword search operation to the unstructured data based upon the identified tags; and, computer readable program code for including in the aggregation the result set from the additional keyword search operation.

\* \* \* \* \*